US009749843B2

(12) United States Patent
Yonekura

(10) Patent No.: US 9,749,843 B2
(45) Date of Patent: Aug. 29, 2017

(54) MODEL NAME DETERMINATION

(71) Applicant: Empire Technology Development LLC, Wilmington, DE (US)

(72) Inventor: Seiichiro Yonekura, Yokohama-shi (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/808,172

(22) Filed: Jul. 24, 2015

(65) Prior Publication Data
US 2017/0026827 A1 Jan. 26, 2017

(51) Int. Cl.
*H04M 3/00* (2006.01)
*H04W 8/22* (2009.01)

(52) U.S. Cl.
CPC .................... *H04W 8/22* (2013.01)

(58) Field of Classification Search
CPC ....... H04W 8/245; H04W 8/26; H04W 8/265; H04W 24/02; H04W 88/02; H04M 3/00
USPC ................................. 455/418, 419
See application file for complete search history.

(56) References Cited

U.S. PATENT DOCUMENTS

| | | | |
|---|---|---|---|
| 8,391,934 B1 | 3/2013 | Chan et al. | |
| 2007/0189272 A1* | 8/2007 | Hutchinson | H04L 41/5067 370/352 |
| 2014/0080478 A1* | 3/2014 | Costelloe | H04W 8/24 455/423 |
| 2014/0235258 A1* | 8/2014 | Chen | H04W 4/003 455/452.1 |
| 2015/0085756 A1* | 3/2015 | Sheth | H04W 8/205 370/329 |

OTHER PUBLICATIONS

"Digital cellular telecommunications system (Phase 2+); International Mobile station Equipment Identities (IMEI)," Technical Specification, GSM 02.16, version 7.2.0, ETSI TS 100 508, Release 1998, European Telecommunications Standards Institute, pp. 1-11 (Jul. 2000).
"Digital cellular telecommunications system (Phase 2+); Universal Mobile Telecommunications System (UMTS)," Technical Specification, 3GPP TS 22.016, version 11.0.0, Release 11, European Telecommunications Standards Institute, pp. 1-10 (Oct. 2012).
"IMEI Allocation and Approval Guidelines," Version 6.0, GSM Association, pp. 1-33 (Jul. 27, 2011).
"IMEI Allocation and Approval Process," Version 7.0, GSM Association, pp. 1-32 (Oct. 31, 2013).

(Continued)

*Primary Examiner* — Temica M Beamer
(74) *Attorney, Agent, or Firm* — Brundidge & Stanger, P.C.

(57) ABSTRACT

A method performed under control of a mobile device may include reading module IDs from multiple modules of the mobile device; combining the read module IDs to generate a module combination regarding the mobile device; and determining a TAC of the mobile device corresponding to the generated module combination based, at least in part, on a data set for multiple module combinations.

16 Claims, 9 Drawing Sheets

(56) References Cited

OTHER PUBLICATIONS

Honan, M., "Google's New Modular Phone May Be the Last You'll Need to Buy," accessed at https://web.archive.org/web/20150318072102/http://www.wired.com/2014/04/google-project-ara/, Apr. 16, 2014, pp. 9.
La, L., "ZTE's modular phone concept lets you swap out phone hardware," accessed at https://web.archive.org/web/20140903193228/http://www.cnet.com/products/zte-eco-mobius-modular-concept-phone/, Updated Jan. 13, 2014, pp. 3.
Musil, S., "Motorola unveils Project Ara for custom smartphones," accessed at http://web.archive.org/web/20141120203623/http://www.cnet.com/news/motorola-unveils-project-ara-for-custom-smartphones/, Oct. 28, 2013, pages 3.
Padre, J., "Sony introduces MESH—a prototype creative technology platform," accessed at https://web.archive.org/web/20150316124846/http://developer.sonymobile.com/2014/05/22/sony-introduces-mesh-a-prototype-creative-technology-platform/, May 22, 2014, pp. 4.
Rosenblatt, S., "Google targeting Project Ara modular phone for Jan. 2015," accessed at https://web.archive.org/web/20150405154921/http://www.cnet.com/news/google-targeting-project-ara-phone-for-january-2015/, Apr. 15, 2014, pp. 4.

\* cited by examiner

FIG. 3

| | 301 | 302 | 303 | 304 | 305 | 306 | 307 | 308 |
|---|---|---|---|---|---|---|---|---|
| | MODEL NAME | TAC | RF MODULE | OUTSIDE CAMERA MODULE | INSIDE CAMERA MODULE | NFC MODULE | CHASSIS | CONTROL MODULE |
| 309 | AA1000 | 35100000 | NA | 1600 | YES | YES | L | H |
| 310 | AA1001 | 35100001 | NA | 800 | YES | YES | L | H |
| 311 | AA1002 | 35100002 | NA | NO | YES | YES | L | H |
| 312 | AB1003 | 35100021 | NA | 1600 | NO | NO | S | H |
| 313 | AB1004 | 35100022 | NA | 800 | NO | NO | S | H |
| 314 | AB1005 | 35100023 | NA | NO | NO | NO | S | H |
| 315 | EA1015 | 35100087 | EU | 1600 | NO | YES | S | S |
| 316 | EA1016 | 35100088 | EU | 800 | NO | YES | S | S |
| 317 | EA1017 | 35100089 | EU | NO | NO | YES | S | S |
| 318 | EB1012 | 35100102 | EU | 1600 | YES | NO | L | S |
| 319 | EB1013 | 35100103 | EU | 800 | YES | NO | L | S |
| 320 | EB1014 | 35100104 | EU | NO | YES | NO | L | S |
| 321 | PC1009 | 35100189 | AP | 1600 | NO | YES | L | M |
| 322 | PC1010 | 35100190 | AP | 800 | NO | YES | L | M |
| 323 | PC1011 | 35100191 | AP | NO | NO | YES | L | M |
| 324 | PD1006 | 35100204 | AP | 1600 | YES | NO | S | M |
| 325 | PD1007 | 35100205 | AP | 800 | YES | NO | S | M |
| 326 | PD1008 | 35100206 | AP | NO | YES | NO | S | M |

FIG. 4

| | MODEL NAME | TAC | RF MODULE | OUTSIDE CAMERA MODULE | INSIDE CAMERA MODULE | NFC MODULE | CHASSIS | CONTROL MODULE |
|---|---|---|---|---|---|---|---|---|
| | 401 | 402 | 403 | 404 | 405 | 406 | 407 | 408 |
| 409 | EA1000 | 35100216 | EU2 | 1600 | YES | YES | L | H |
| 410 | EA1001 | 35100217 | EU2 | 800 | YES | YES | L | H |
| 411 | EA1002 | 35100218 | EU2 | NO | YES | YES | L | H |
| 412 | EA1015 | 35100231 | EU2 | 1600 | NO | YES | S | S |
| 413 | EA1016 | 35100232 | EU2 | 800 | NO | YES | S | S |
| 414 | EA1017 | 35100233 | EU2 | NO | NO | YES | S | S |
| 415 | EB1003 | 35100237 | EU2 | 1600 | NO | NO | S | H |
| 416 | EB1004 | 35100238 | EU2 | 800 | NO | NO | S | H |
| 417 | EB1005 | 35100239 | EU2 | NO | NO | NO | S | H |
| 418 | EB1012 | 35100246 | EU2 | 1600 | YES | NO | L | S |
| 419 | EB1013 | 35100247 | EU2 | 800 | YES | NO | L | S |
| 420 | EB1014 | 35100248 | EU2 | NO | YES | NO | L | S |
| 421 | EC1009 | 35100261 | EU2 | 1600 | NO | YES | L | M |
| 422 | EC1010 | 35100262 | EU2 | 800 | NO | YES | L | M |
| 423 | EC1011 | 35100263 | EU2 | 1600 | NO | YES | L | M |
| 424 | ED1006 | 35100276 | EU2 | 1600 | YES | NO | L | M |
| 425 | ED1007 | 35100277 | EU2 | 800 | YES | NO | S | M |
| 426 | ED1008 | 35100278 | EU2 | NO | YES | NO | S | M |

MODEL NAME DETERMINATION

BACKGROUND

While the configuration of mobile phones is conventionally predetermined by its manufacturer, a new method to configure mobile phones in a modular manner has recently been proposed. This method allows end users to select modules for the mobile phones on the basis of their preference, and assemble the selected modules by themselves. In this manner, this method provides the end users with features oriented mobile phones that are customized according to their needs.

For mobile phones to be used in an actual telecommunication network, the mobile phones should go through various regulatory tests and approvals such as Type Approval ("TA"), compliance tests, etc. before they are placed in the markets. Such regulatory tests and approvals require the mobile phones to be provided with unique identifiers such as model names and IMEI (International Mobile Station Equipment Identity). However, mobile phones configured by the above method may not be provided with such identifiers before they are assembled by the end users.

SUMMARY

In an example, a method performed under control of a mobile device may include reading module IDs from a plurality of modules of the mobile device; combining the read module IDs to generate a module combination regarding the mobile device; and determining a TAC (Type Approval Code) of the mobile device corresponding to the generated module combination based, at least in part, on a data set for a plurality of module combinations.

In another example, a mobile device may include a plurality of modules including a control module; and a memory configured to store a data set for a plurality of module combinations. The control module may be configured to read module IDs from two or more modules among the plurality of modules; combine the read module IDs to generate a module combination of the mobile device; and determine whether the generated module combination corresponds to one of the plurality of module combinations of the data set.

In yet another example, a computer-readable storage medium may store thereon computer-executable instructions that, in response to execution, cause a mobile device to perform operations, including reading module IDs from a plurality of modules of the mobile device; combining the read module IDs to generate a module combination regarding the mobile device; determining a TAC (Type Approval Code) of the mobile device corresponding to the generated module combination based, at least in part, on a data set for a plurality of module combinations; determining a model name of the mobile device corresponding to the generated module combination based, at least in part, on the data set for a plurality of module combinations; and storing, in a memory of the mobile device, the determined TAC and the determined model name.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. With the understanding that these drawings depict only several embodiments in accordance with the disclosure and are, therefore, not to be considered limiting of its scope, the disclosure will be described with additional specificity and detail through use of the accompanying drawings, in which:

FIG. 3 shows an example of a data set for multiple module combinations to implement at least one example embodiment of a model name determination scheme, arranged in accordance with at least some embodiments described herein;

FIG. 4 shows another example of a data set for multiple module combinations to implement at least one example embodiment of a model name determination scheme, arranged in accordance with at least some embodiments described herein;

DETAILED DESCRIPTION

Figure 1:
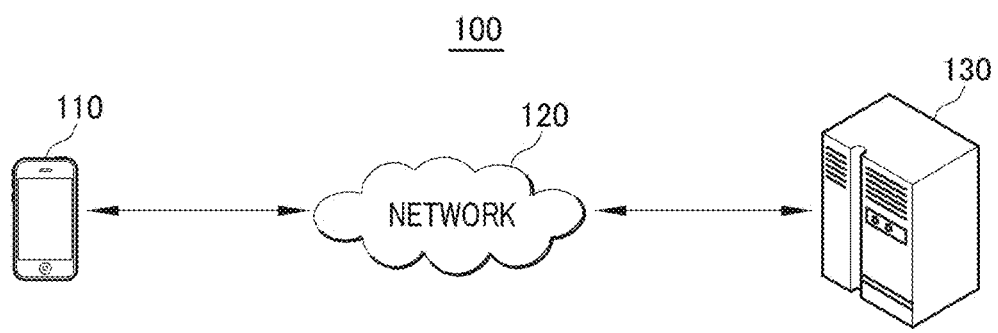
FIG. 1 shows an illustrative example of a model name determination environment including a mobile device, a network and a server, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatuses, systems, devices, and computer program products related to a model name determination scheme. Technologies are generally described for schemes for determining a model name, a TAC (Type Approval Code) and an IMEI (International Mobile Station Equipment Identity) of a mobile device based on a module combination of the mobile device.

In some embodiments, a mobile device may be generated by combining multiple modules by a user. The mobile device may be configured to read module IDs from the multiple modules. Further, the mobile device may be configured to combine the read module IDs to generate a module combination regarding the mobile device and the module combination may present a configuration of the mobile device. In some embodiments, the mobile device may be configured to determine whether the generated module combination corresponds to one of the multiple module combinations of a data set stored in the mobile device. By way of example, but not limitation, the data set for the multiple module combinations may include multiple TACs and corresponding model names, and each TAC and its corresponding model name may correspond to one of the multiple module combinations. In some embodiments, the mobile device may be configured to identify a TAC and a model name of the mobile device in response to determining that the generated module combination corresponds to one of the multiple module combinations of the data set. For example, the TAC of the mobile device may certify that the configuration of the mobile device has passed Type Approval tests by any regulatory body. On the other hand, the mobile device may generate a first alert signal in response to determining that the generated module combination does not correspond to one of the multiple module combinations of the data set. In some embodiments, the mobile device may be configured to read a serial number of a RF module of the mobile device. Further, the mobile device may calculate a check digit using a specified algorithm. In some embodiments, the mobile device may be configured to determine an IMEI of the mobile device based on at least one of the identified TAC, the read serial number of the RF module or the calculated check digit. For example, the IMEI given to the mobile device may be dedicated numbers for the mobile device in participating in network communications. In some embodiments, the mobile device may be configured to display at least one of the identified TAC, the identified model name or the determined IMEI on a display of the mobile device.

FIG. 1 shows an illustrative example of a model name determination environment 100 including a mobile device 110, a network 120 and a server 130, arranged in accordance with at least some embodiments described herein. As depicted, mobile device 110 and server 130 may be communicatively connected to each other via network 120. By way of example, but not limitation, the network may be implemented in accordance with any wireless network protocol such as, for example, the Internet, a satellite network, Bluetooth, WiBro (Wireless Broadband) Internet, GSM, UMTS, LTE, LTE-M, LTE-Advanced, WiFi, Wi-SUN, WiMAX 2+ or the like.

In some embodiments, mobile device 110 may be configured by selecting multiple modules and assembling the selected modules by a user according to his/her needs. By way of example, but not limitation, the multiple modules may include at least one of a control module, a RF module, a camera module, a Near Field Communication (NFC) module, a power supply module, a battery pack, a memory or a chassis.

In some embodiments, mobile device 110 may be configured to read module IDs from the multiple modules assembled and combined in the mobile device 110. By way of example, but not limitation, a module ID of each of the multiple modules may be stored in a memory of the module. By way of example, but not limitation, each module ID of the multiple modules may represent a type of the module. Further, mobile device 110 may be configured to combine the read module IDs to generate a module combination regarding mobile device 110. For example, the generated module combination of mobile device 110 may represent a configuration of mobile device 110 including a particular combination of modules.

In some embodiments, mobile device 110 may be configured to determine a TAC and a model name of mobile device 110 corresponding to the generated module combination based on a data set for multiple module combinations. The data set for the multiple module combinations may be stored in a memory of mobile device 110. By way of example, but not limitation, the multiple module combinations may include a plurality of module combinations for mobile device 110 which can be generated by the user to indicate different combinations of modules. The data set for the multiple module combinations may include multiple TACs and corresponding model names, and each pair of a TAC and its corresponding model name may correspond to one of the multiple module combinations. In some embodiments, mobile device 110 may be configured to determine whether the generated module combination corresponds to one of the multiple module combinations in the data set, thereby determining a TAC and a module name of mobile device 110.

In some embodiments, mobile device 110 may be configured to store the determined TAC and model name in the memory of mobile device 110. In some embodiments, mobile device 110 may be configured to display at least one of the determined TAC or model name on a display of mobile device 110, for example, in response to a request from the user for displaying the determined TAC and/or model name.

In some embodiments, mobile device 110 may be configured to generate a first alert signal, in response to the determination that the generated module combination does not correspond to any one of the multiple combinations of the data set. By way of example, but not limitation, the first alert signal may inform the user that the configuration of mobile device 110 has to be changed since the generated module combination is not available. In response to the first alert signal, at least one module of the combined multiple modules may be replaced with another module to generate a second module combination which is available in the data set.

In some embodiments, mobile device 110 may be configured to transmit a request for a latest data set to server 130. In some embodiments, mobile device 110 with the second module combination may be configured to transmit a request for a latest data set to server 130 in response to the first alert signal. In some embodiments, mobile device 110 may be configured to receive the latest data set from server 130 and update the data set stored in the memory of mobile device 110 with the received latest data set. By way of example, but not limitation, the updated data set may include at least one new module combination for mobile device 110, and at least one pair of new TAC and corresponding new model name, each of which corresponds to each of the at least one new module combination. In response to updating the data set, the configuration of mobile device 110 may be changed back to the generated module combination from the second module combination.

In some embodiments, mobile device 110 may be configured to determine whether the generated module combination corresponds to one of the multiple combinations of the updated data set. If the generated module combination corresponds to one of the multiple combinations of the updated data set, that is, by way of example, but not limitation, the generated module combination corresponds to one of the at least one new module combination for mobile device 110 included in the updated data set, mobile device 110 may be configured to determine a TAC and a model name for mobile device 110 corresponding to the generated module combination based on the updated data set. Further, mobile device 110 may be configured to store the determined TAC and model name for mobile device 110 in the memory of mobile device 110. In some embodiments, mobile device 110 may be configured to display at least one of the determined TAC and model name on a display of mobile device 110.

In some embodiments, mobile device 110 may be configured to generate a second alert signal, in response to the determination that the generated module combination does not correspond to any one of the multiple module combinations of the updated data set. By way of example, but not limitation, the second alert signal may inform the user that the configuration of mobile device 110 has to be changed since the generated module combination is not available.

In some embodiments, mobile device 110 may be configured to read the determined TAC from the memory of mobile device 110. In some embodiments, mobile device 110 may be configured to read a serial number of a RF module among the combined multiple module. The serial number of the RF module may have been stored in a memory of the RF module. In some embodiments, mobile device 110 may be configured to generate a third alert signal, if there is a problem to read at least one of the TAC of mobile device 110 or the serial number of the RF module.

In some embodiments, mobile device 110 may be configured to calculate a check digit using a suitable algorithm. In some embodiments, mobile device 110 may be configured to determine an IMEI of mobile device 110 based on at least one of the read TAC of mobile device 110, the read serial number of the RF module or the calculated check digit. In some embodiments, mobile device 110 may be configured to store the determined IMEI in the memory of mobile device 110. Further, mobile device 110 may be configured to transmit the determined IMEI to server 130. In some embodiments, mobile device 110 may be configured to display the determined IMEI on the display of mobile device 110 especially in response to a request, from the user, for displaying the IMEI of mobile device 110.

In some embodiments, mobile device 110 may be configured to transmit a request for a latest data set on a periodic basis to server 130. In some embodiments, mobile device 110 may be configured to receive the latest data set from server 130 and update the data set stored in the memory of mobile device 110 with the received latest data set. By way of example, but not limitation, the updated data set may include at least one new module combination for mobile device 110, and at least one pair of new TAC and corresponding new model name, each of which corresponds to each of the at least one new module combination.

In some embodiments, mobile device 110 may be configured to read at least one module ID and/or serial number from the combined multiple modules of mobile device 110. By way of example, but not limitation, a module ID and a serial number of each of the multiple modules may have been stored in a memory of the module. Further, mobile device 110 may be configured to transmit the at least one read module ID and/or serial number associated with the determined IMEI to server 130.

In some embodiments, server 130 may be configured to receive a request for a latest data set from mobile device 110. In response to the request, server 130 may be configured to transmit the latest data set to mobile device 110. By way of example, but not limitation, the latest data set may be stored in a database of server 130.

In some embodiments, server 130 may be configured to receive an IMEI of mobile device 110 and store the received IMEI of mobile device 110 in the database of server 130. Further, if server 130 receives a latest IMEI from mobile device 110, server 130 may be configured to replace a previous IMEI of mobile device 110 stored in the database of server 130 with the received latest IMEI. In some embodiments, server 130 may be configured to receive at least one module ID and/or serial number of the combined multiple modules regarding mobile device 110 and associate the at least one received module ID and/or serial number of the multiple modules with the IMEI stored in the database of server 130 in order to set up traceability of mobile device 110.

Figure 2:
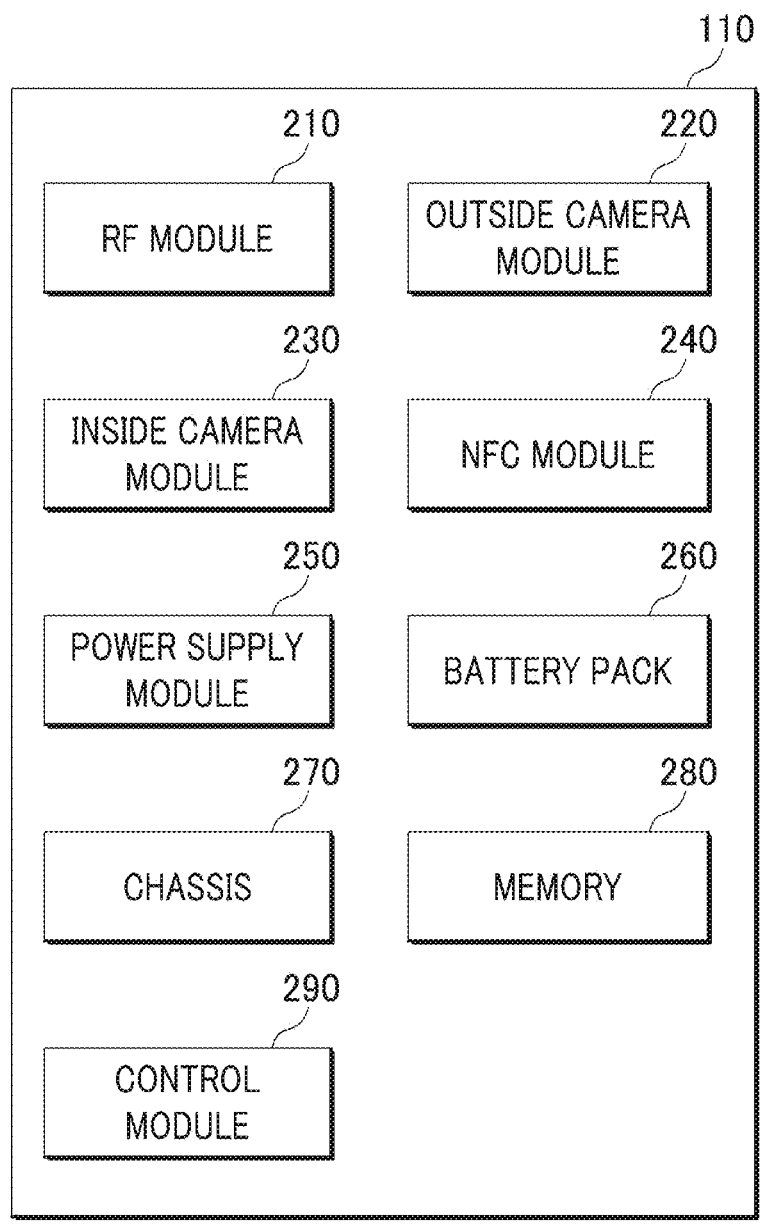
FIG. 2 shows a block diagram of an example architecture for a mobile device, arranged in accordance with at least some embodiments described herein.

FIG. 2 shows a block diagram of an example architecture for mobile device 110, arranged in accordance with at least some embodiments described herein. As depicted in FIG. 2, mobile device 110 may be generated by combining a RF module 210, an outside camera module 220, an inside camera module 230, a NFC module 240, a power supply module 250, a battery pack 260, a chassis 270, a memory 280 and a control module 290. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. Further, reference may be made to the embodiments depicted and described with reference to FIG. 1.

In some embodiments, RF module 210 may be configured to provide control module 290 with its own module ID. By way of example, but not limitation, RF module 210 may be one of three types of RF modules with module names NA, EU and AP, respectively. Each type of the RF modules may have different operating band and at least one of the tree types may support WiBro, Wi-SUN, WiMAX 2+, LTE-M, LTE-Advanced, GSM, UMTS, LTE, WiFi and/or Bluetooth. Thereby, by way of example, but not limitation, the module ID of RF module 210 may be one of NA, EU or AP to indicate the type of RF module 210. In some embodiments, RF module 210 may be further configured to provide control module 290 with its own serial number. By way of example, but not limitation, the module ID and/or the serial number of RF module 210 may be stored in a memory (not depicted) of RF module 210.

In some embodiments, RF module 210 may be configured to transmit a request for a latest data set to server 130. By way of example, but not limitation, the request for the latest data may be transmitted to server 130 in response to a change of a module combination of mobile device 110. By way of example, but not limitation, the request for the latest data may be transmitted to server 130 on a periodic basis. In some embodiments, RF module 210 may be configured to receive the latest data set from server 130. In some embodiments, RF module 210 may be configured to transmit an IMEI of mobile device 110 to server 130. In some embodiments, RF module 210 may be configured to transmit a module ID and/or a serial number of at least one of RF module 210, outside camera module 220, inside camera module 230, NFC module 240, power supply module 250, battery pack 260, chassis 270, memory 280, and control module 290 to server 130.

In some embodiments, outside camera module 220 may be configured to provide control module 290 with its own module ID. By way of example, but not limitation, outside camera module 220 may be one of two types of outside camera modules, for example, 1.6 G pixel type and 800 M pixel type, or absent of any type. Thereby, to indicate the type of RF module 210, the module ID of outside camera module 220 may be one of 1600, 800 or NO. In some embodiments, outside camera module 220 may be further configured to provide control module 290 with its own serial number. By way of example, but not limitation, the module ID and/or the serial number of outside camera module 220 may be stored in a memory (not depicted) of outside camera module 220.

In some embodiments, inside camera module 230 may be configured to provide control module 290 with its own module ID. By way of example, but not limitation, the module ID may be one of YES or NO to indicate whether inside camera module 230 is present or absent. In some embodiments, inside camera module 230 may be further configured to provide control module 290 with its own serial number. By way of example, but not limitation, the module ID and/or the serial number of inside camera module 230 may be stored in a memory (not depicted) of inside camera module 230.

In some embodiments, NFC module 240 may be configured to provide control module 290 with its own module ID. By way of example, but not limitation, the module ID may be one of YES or NO to indicate whether NFC module 240 is present or absent. In some embodiments, NFC module 240 may be further configured to provide control module 290 with its own serial number. By way of example, but not limitation, the module ID and/or the serial number of NFC module 240 may be stored in a memory (not depicted) of NFC module 240.

In some embodiments, power supply module 250 may be configured to provide control module 290 with its own module ID. By way of example, but not limitation, power supply module 250 may be a type of a power supply module which is commonly used. In some embodiments, power supply module 250 may be further configured to provide control module 290 with its own serial number. By way of example, but not limitation, the module ID and/or the serial number of power supply module 250 may be stored in a memory (not depicted) of power supply module 250.

In some embodiments, battery pack 260 may be configured to provide control module 290 with its own module ID. By way of example, but not limitation, battery pack 260 may be one of two types of battery packs, for example, hi-capacity or low-capacity. In some other embodiments, the module ID of battery pack 260 may not be provided to control module 290 since battery pack 260 may not have an effect on Type Approval test results of mobile device 110. In some embodiments, battery pack 260 may be configured to provide control module 290 with its own serial number. By way of example, but not limitation, the module ID and/or the serial number of battery pack 260 may be stored in a memory (not depicted) of battery pack 260.

In some embodiments, chassis 270 may be configured to provide control module 290 with its own module ID. By way of example, but not limitation, chassis 270 may be one of two types of chassis, for example, a large Liquid Crystal Display (LCD) or a small LCD. Thereby, to reflect the type of chassis 270, the module ID of chassis 270 may be one of L or S. In some embodiments, chassis 270 may be further configured to provide control module 290 with its own serial number. By way of example, but not limitation, the module ID and/or the serial number of chassis 270 may be stored in a memory (not depicted) of chassis 270.

By way of example, but not limitation, chassis 270 may include a LCD screen and further at least one of a Light-Emitting Diode (LED) indicator, a power switch, a volume up/down key, an earphone, an external microphone jack, a microphone, a speaker, a Universal Serial Bus (USB) connector, a Subscriber Identity Module (SIM) holder, a battery terminal, an antenna or other ancillary components. Although chassis 270 is illustrated as a block in FIG. 2, chassis 270 may have any type of shape that is suitable to support and accommodate the above components for mobile device 110. In some embodiments, the LCD screen of chassis 270 may be configured to display at least one of a TAC, a model name or an IMEI regarding mobile device 110.

In some embodiments, memory 280 may be configured to provide control module 290 with its own module ID. By way of example, but not limitation, memory 280 may be a type of a memory which is commonly used. In some embodiments, memory 280 may be further configured to provide control module 290 with its own serial number. In some embodiments, memory 280 may be further configured to store its own module ID and/or serial number.

In some embodiments, memory 280 may be configured to store a data set for multiple module combinations. By way of example, but not limitation the data set may include all cases of module combinations for mobile device 110 to be generated by combining RF module 210, outside camera module 220, inside camera module 230, NFC module 240, power supply module 250, battery pack 260, chassis 270, memory 280 and/or control module 290. The data set for the multiple module combinations may include multiple TACs and corresponding model names, and each pair of TAC and its corresponding model name may correspond to one of the multiple module combinations.

In some embodiments, memory 280 may be configured to store a data set updated with the latest data set received from server 130. By way of example, but not limitation, the updated data set may include at least one new module combination for mobile device 110, and at least one pair of new TAC and corresponding new model name, each of which corresponds to each of the at least one new module combination. In some embodiments, memory 280 may be configured to store at least one of a TAC, a model name or an IMEI of mobile device 110. Although memory 280 is illustrated as a discrete component of mobile device 110, memory 280 may be a part of control module 290.

In some embodiments, control module 290 may be configured to read module IDs from at least two of RF module 210, outside camera module 220, inside camera module 230, NFC module 240, power supply module 250, battery pack 260, chassis 270, memory 280 or a control module 290. By way of example, but not limitation, in a case of reading a module ID of at least one of inside camera module 230, outside camera module 220 or NFC module 240, when control module 290 detects that the at least one of inside camera module 230, outside camera module 220 or NFC module 240 is not present, the module ID of the absent module may be determined as NO.

By way of example, but not limitation, control module 290 may be one of three types of control modules, for example, high (H) functionality, mid (M) functionality or simple (S) functionality. Thereby, by way of example, but not limitation, the module ID of control module 290 may be one of H, M or S to reflect the type of control module 290. By way of example, but not limitation, the module ID of control module 290 may be stored in a memory (not depicted) of control module 290.

In some embodiments, control module 290 may be further configured to combine the read module IDs to generate a module combination which may represent a configuration of mobile device 110. In some embodiments, control module 290 may be further configured to determine whether the generated module combination corresponds to one of the multiple module combinations of the data set stored in memory 280. By way of example, but not limitation, assuming that there may be three types of the module ID for RF module 210; three types of the module ID for outside camera module 220; two types of the module ID for inside camera module 230; two types of the module ID for NFC module 240; one type of power supply module 250; two types of the module ID for battery pack 260; two types of the module ID for chassis 270; one type of memory 280; and three types of module ID for control module 290, there may be a total of 216 possible module combinations for mobile device 110 using the above-described components 210-290. These possible module combinations may be included in the data set stored in memory 280.

In some embodiments, control module 290 may be further configured to identify a TAC and a model name for mobile device 110, if control module 290 determines that the generated module combination corresponds to one of the multiple module combinations of the data set. On the other hand, if control module 290 determines that the generated module combination does not correspond to any one of the multiple module combinations of the data set, control module 290 may be configured to generate an alert signal to inform a user that the configuration of mobile device 110 has to be changed since the generated module combination is not available.

In some embodiments, control module 290 may be configured to read the identified TAC from memory 280. In some embodiments, control module 290 may be configured to read the serial number of RF module 210. In some embodiments, control module 290 may be configured to calculate a check digit using a suitable algorithm. In some embodiments, control module 290 may be configured to determine an IMEI of mobile device 110 based on at least one of the read TAC of mobile device 110, the read serial number of RF module 210 or the calculated check digit. By way of example, but not limitation, the IMEI of mobile device 110 may have 15 digits consisting of 8 digits of the TAC of mobile device 110, 6 digits of the serial number of RF module 210 and one digit of the check digit.

In some embodiments, control module 290 may be configured to read a serial number from at least one of RF module 210, outside camera module 220, inside camera module 230, NFC module 240, power supply module 250, battery pack 260, chassis 270, memory 280, and control module 290. In some embodiments, control module 290 may be configured to receive a request for displaying the TAC, the model name and/or the IMEI of mobile device 110 from the user.

FIG. 3 shows an example of a data set for multiple module combinations to implement at least one example embodiment of a model name determination scheme, arranged in accordance with at least some embodiments described herein. Although there may be 216 module combinations for mobile device 110 using the above mentioned types of components 210-290, only a portion of the multiple module combinations for mobile device 110, and multiple TACs and corresponding model names, each of which corresponds to each of the multiple module combinations, are included in the data set of FIG. 3 for illustration purpose. Reference may be made to the embodiments depicted and described with reference to FIGS. 1 and 2.

As depicted in FIG. 3, a first column 301 may indicate a model name of mobile device 110; a second column 302 may indicate a TAC of mobile device 110; a third to eighth columns 303-308 may indicate module IDs of a RF module (303), an outside camera module (304), an inside camera module (305), a NFC module (306), chassis (307), and a control module (308), respectively. Further, rows 309-326 may indicate multiple module combinations for mobile device 110.

In some embodiments, the data set may be stored in memory 280 of mobile device 110. Further, the data set may be referenced by control module 290 of mobile device 110 to determine a model name and a TAC, and further an IMEI of mobile device 110.

In accordance with one non-limiting example, when mobile device 110 is generated by combing multiple modules such as a memory and a control module, mobile device 110 (for example, control module 290) may read module IDs from the combined multiple modules and combine the read modules IDs to generate a module combination regarding mobile device 110. Further, mobile device 110 (for example, control module 290) may determine whether the generated module combination corresponds to one of the multiple module combinations of the data set. If the generated module combination corresponds to one of the multiple module combinations of the date set, mobile device 110 (for example, control module 290) may identify a TAC and corresponding model name of mobile device 110 which corresponds to the generated module combination.

For instance, if mobile device 110 is configured to include a RF module with a module name of EU (i.e., a module ID of EU), no outside camera module (i.e., a module ID of NO), no inside camera module (i.e., a module ID of NO), a NFC module (i.e., a module ID of YES), a power supply module, battery pack of hi-capacity, chassis with a small LCD (i.e., a module ID of S), a memory and a control module of simple functionality (i.e., a module ID of S), the above module combination corresponds to module combination 317 in the data set. In this case, the TAC of mobile device 110 is identified as 35100089 and the model name of mobile device 110 is identified as EA1017. The identified TAC and model name may be stored in memory 280 of mobile device 110.

In the above instance, mobile device 110 (for example, control module 290) may read the identified TAC of mobile device 110 and a serial number of the RF module and calculate a check digit to determine an IMEI of mobile device 110 by combining the read TAC, the read serial number of the RF module and the calculated check digit. By way of example, but not limitation, the IMEI of mobile device 110 may have 15 digits consisting of 8 digits of the TAC of mobile device 110, 6 digits of the serial number of the RF module and one digit of the check digit. Given that the serial number of the RF module is 123432 and the calculated check digits is 1, since the identified TAC of mobile device 110 is 35100089, the IMEI of mobile device 110 is 351000891234321. In this regard, even if one of the multiple modules of mobile device 110 has been replaced with another module, when the other module has the same module ID as the replaced module, the TAC of mobile device 110 may not be changed. However, the other module has the same module ID as the replaced module but a different serial number from that of the replaced module. Accordingly, even if the TAC of mobile device 110 has not been changed, the IMEI of mobile device 110 may be changed due to the changed serial number.

For instance, if mobile device 110 is configured to include a RF module with a module name of NA (i.e., a module ID of NA), an outside camera module of 1.6 G pixels (i.e., a module ID of 1600), no inside camera module (i.e., a module ID of NO), a NFC module (i.e., a module ID of YES), a power supply module, a battery pack of hi-capacity, chassis with a large LCD (i.e., a module ID of L), a memory and a control module of mid functionality (i.e., a module ID of M), the above module combination does not correspond to any one of the multiple module combination in the data set. Accordingly, the above combination of modules in mobile device 110 is not available to use, and thus, mobile device 110 may generate an alert signal.

As such, mobile device 110 may be able to determine the TAC and/or model name of mobile device 110 with reference to the data set. It would be appreciated that the TACs, the module names and the module IDs of the RF module, the outside camera module, the inside camera module, the NFC module, the chassis and the control module type for determination illustrated in the data set are non-limiting example parameters and any other parameters to implement the model name determination scheme in accordance with multiple embodiments described here will be available for the data set.

FIG. 4 shows another example of a data set for multiple module combinations to implement at least one example embodiment of a model name determination scheme, arranged in accordance with at least some embodiments described herein. Reference may be made to the embodiments depicted and described with reference to FIGS. 1-3.

As depicted in FIG. 4, a first column 401 may indicate a model name of mobile device 110; a second column 402 may indicate a TAC of mobile device 110; a third to eighth columns 403-408 may indicate module IDs of a RF module (403), an outside camera module (404), an inside camera module (405), a NFC module (406), chassis (407), and a control module (408), respectively. Further, rows 409-426 may indicate multiple module combinations for mobile device 110.

In some embodiments, the data set may be stored in memory 280 of mobile device 110. Further, the data set may be referenced by control module 290 of mobile device 110 to determine a model name and a TAC, and further an IMEI of mobile device 110. As mentioned above with reference to FIG. 3, by way of example, but not limitation, a serial number of the RF module may have 6 digits in a range of 000000 to 999999. In accordance with one non-limiting example, if the production volume of the RF module with a module name of EU, for example, exceeds one million, the RF module may not be represented using a serial number of 6 digits. In this case, RF module may be given another name EU2, and thereby new TACs are assigned as exemplified in the data set in FIG. 4.

For instance, if mobile device 110 consists of a RF module with a module name of EU2 (i.e., a module ID of EU2), no outside camera module (i.e., a module ID of NO), no inside camera module (i.e., a module ID of NO), a NFC module (i.e., a module ID of YES), a power supply module, a battery pack of hi-capacity, chassis with a small LCD (i.e., a module ID of S), a memory and a control module of simple functionality (i.e., module ID of S), the above module combination corresponds to a module combination 414 in the data set. In this case, the TAC of mobile device 110 is identified as 35100233, which is different from the module combination 317 depicted in FIG. 3, since the module ID of the RF module has been changed. However, the model name of mobile device 110 is identified as EA1017, similarly to the module combination 317 depicted in FIG. 3, since both module combinations 317 and 414 have the same configuration.

As such, mobile device 110 may be able to determine the TAC and/or model name of mobile device 110 with reference to the data set. It would be appreciated that the TACs, the module names and the module IDs of the RF module, the outside camera module, the inside camera module, the NFC module, the chassis and the control module type for determination illustrated in the data set are non-limiting example parameters and any other parameters to implement the model name determination scheme in accordance with multiple embodiments described here will be available for the data set.

Figure 5:
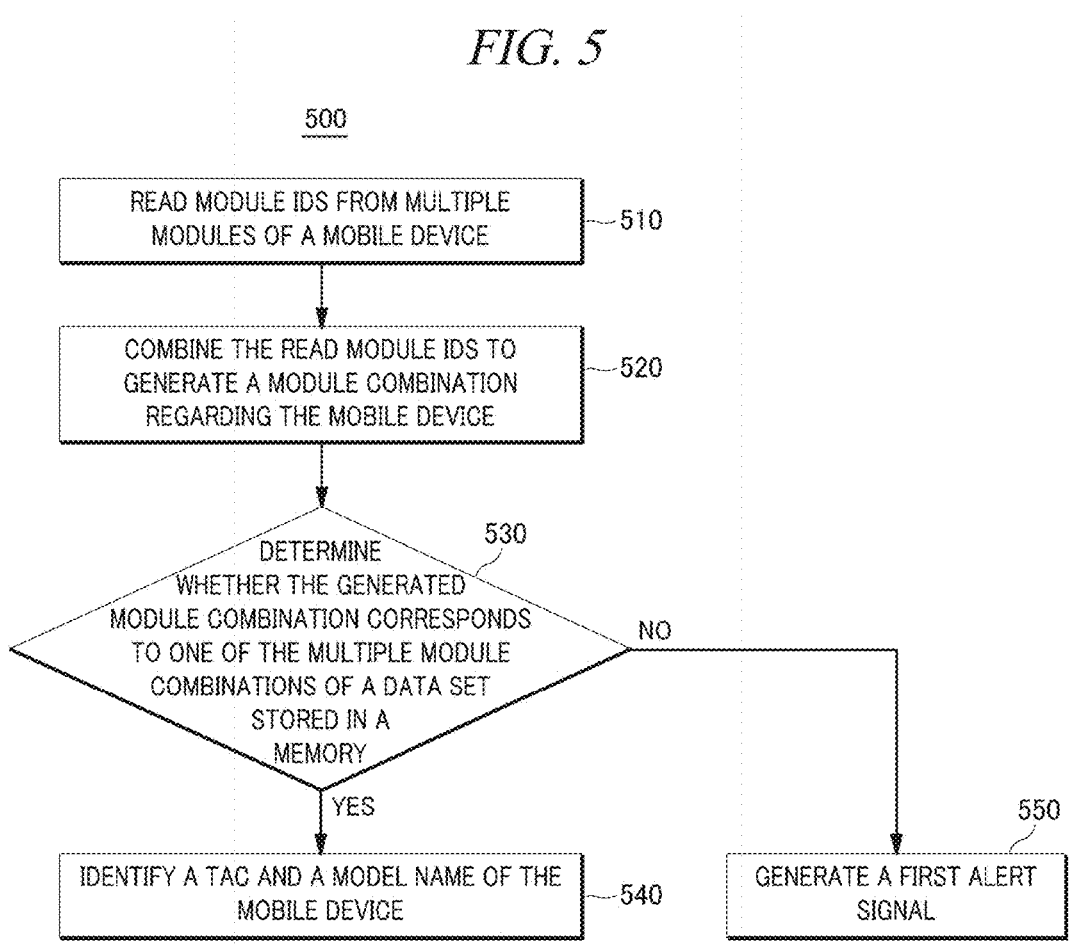
FIG. 5 shows an example flow diagram of a process of a mobile device to perform a model name determination scheme, arranged in accordance with at least some embodiments described herein.

FIG. 5 shows an example flow diagram of a process of a mobile device to perform a model name determination scheme arranged in accordance with at least some embodiments described herein. The operations of process 500 may be implemented in model name determination environment 100 including mobile device 110, network 120 and server 130, as illustrated in FIGS. 1-4. Process 500 may include one or more operations, actions, or functions as illustrated by one or more blocks 510, 520, 530, 540 and/or 550. Although illustrated as discrete blocks, various blocks may be divided into additional blocks, combined into fewer blocks, or eliminated, depending on the desired implementation. Processing may begin at block 510.

At block 510 (Read Module IDs from Multiple Modules of a Mobile Device), the mobile device (such as, for example, control module 290 of mobile device 110) may read module IDs from multiple modules of the mobile device (such as, for example, mobile device 110). By way of example, but not limitation, each module ID of the multiple modules may represent a type of each of the multiple modules of mobile device 110.

At block 520 (Combine the Read Module IDs to Generate a Module Combination Regarding the Mobile Device), the mobile device (such as, for example, control module 290 of mobile device 110) may combine the read module IDs to generate a module combination regarding the mobile device (such as, for example, mobile device 110). For example, the generated module combination of mobile device 110 may represent a configuration of mobile device 110.

At block 530 (Determine Whether the Generated Module Combination Corresponds to one of the Multiple Module Combinations of a Data Set Stored in a Memory), the mobile device (such as, for example, control module 290 of mobile device 110) may determine whether the generated module combination corresponds to one of the multiple module combinations of a data set stored in a memory (such as, for example, memory 280 of mobile device 110). By way of example, but not limitation, the data set for the multiple module combinations may include multiple TACs and corresponding model names, and each pair of TAC and its corresponding model name may correspond to one of the multiple module combinations.

At block 540 (Identify a TAC and a Model Name of the Mobile Device), the mobile device (such as, for example, control module 290 of mobile device 110) may identify a TAC and model name of the mobile device (such as, for example, mobile device 110) in response to determining that the generated module combination corresponds to one of the multiple module combinations of the data set. By way of example, but not limitation, the identified TAC and model name may be stored in memory 280.

At block 550 (Generate a First Alert Signal), the mobile device (such as, for example, control module 290 of mobile device 110) may generate a first alert signal in response to determining that the generated module combination does not correspond to any one of the multiple module combinations of the data set. By way of example, but not limitation, the generated first alert signal may inform a user that the configuration of mobile device 110 has to be changed since the generated module combination is not available.

Figure 6:
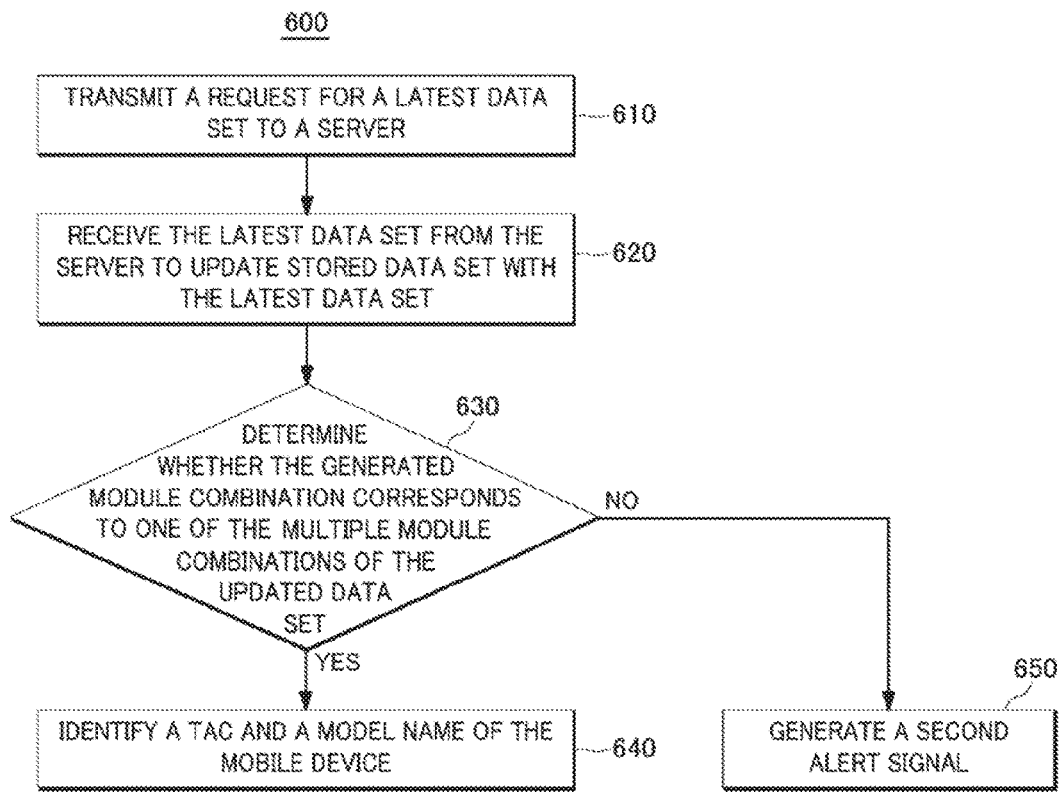
FIG. 6 shows another example flow diagram of a process of a mobile device to perform a model name determination scheme, arranged in accordance with at least some embodiments described herein.

FIG. 6 shows another example flow diagram of a process of a mobile device to perform a model name determination scheme arranged in accordance with at least some embodiments described herein. The operations of process 600 may be implemented in model name determination environment 100 including mobile device 110, network 120 and server 130, as illustrated in FIGS. 1-4. Process 600 may include one or more operations, actions, or functions as illustrated by one or more blocks 610, 620, 630, 640, and/or 650. Although illustrated as discrete blocks, various blocks may be divided into additional blocks, combined into fewer blocks, or eliminated, depending on the desired implementation. Processing may begin at block 610.

At bock 610 (Transmit a Request for a Latest Data Set to a Server), the mobile device (such as, for example, RF module 210 of mobile device 110) may transmit a request for a latest set to a server (such as, for example, server 130). In some embodiments, mobile device 110 may transmit a request for a latest data set to server 130 in response to a first alert signal.

At block 620 (Receive the Latest Data Set from the Server to Update Stored Data Set with the Latest Data Set), the mobile device (such as, for example, RF module 210 of mobile device 110) may receive the latest data set from the server (such as, for example, server 130) to update stored data set with the latest data set. By way of example, but not limitation, the updated data set may include at least one new module combination for mobile device 110, and at least one pair of new TAC and corresponding new model name, each of which corresponds to each of the at least one new module combination.

At block 630 (Determine Whether the Generated Module Combination Corresponds to one of the Multiple Module Combinations of the Update Data Set), the mobile device (such as, for example, control module 290 of mobile device 110) may determine whether the generated module combination corresponds to one of the multiple module combinations of the updated data set.

At block 640 (Identify a TAC and a Model Name of the Mobile Device), the mobile device (such as, for example, control module 290 of mobile device 110) may identify a TAC and model name of the mobile device (such as, for example, mobile device 110) in response to determining that the generated module combination corresponds to one of the multiple module combinations of the updated data set.

At block 650 (Generate a Second Alert Signal), the mobile device (such as, for example, control module 290 of mobile device 110) may generate a second alert signal in response to determining that the generated module combination does not correspond to any one of the multiple module combinations of the updated data set. By way of example, but not limitation, the generated second alert signal may inform a user that the configuration of mobile device 110 has to be changed since the generated module combination is not available.

Figure 7:
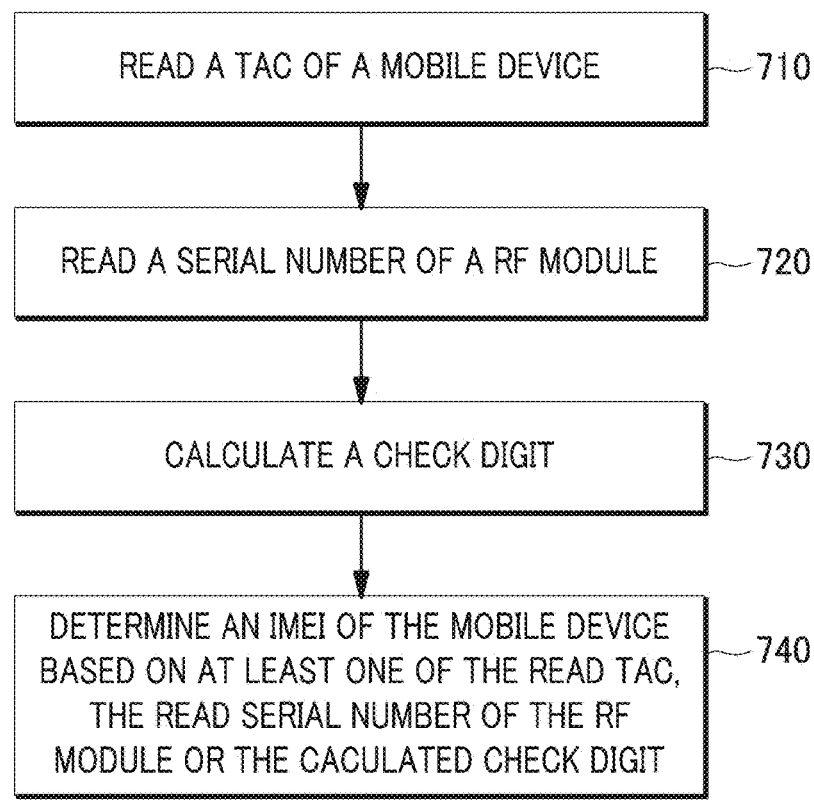
FIG. 7 shows another example flow diagram of a process of a mobile device to perform a model name determination scheme, arranged in accordance with at least some embodiments described herein.

FIG. 7 shows another example flow diagram of a process of a mobile device to perform a model name determination scheme arranged in accordance with at least some embodiments described herein. The operations of process 700 may be implemented in model name determination environment 100 including mobile device 110, network 120 and server 130, as illustrated in FIGS. 1-4. Process 700 may include one or more operations, actions, or functions as illustrated by one or more blocks 710, 720, 730, and/or 740. Although illustrated as discrete blocks, various blocks may be divided into additional blocks, combined into fewer blocks, or eliminated, depending on the desired implementation. Processing may begin at block 710.

At block 710 (Read a TAC of a Mobile Device), the mobile device (such as, for example, control module 290 of mobile device 110) may read a TAC of the mobile device (such as, for example, mobile device 110). By way of example, but not limitation, the TAC of mobile device 110 may have been stored in memory 280.

At block 720 (Read a Serial Number of a RF Module), the mobile device (such as, for example, control module 290 of mobile device 110) may read a serial number of a RF module (such as, for example, RF module 210 of mobile device 110) of the mobile device (such as, for example, mobile device 110). By way of example, but not limitation, the serial number of the RF module may be stored in a memory of RF module 210.

At block 730 (Calculate a Check Digit), the mobile device (such as, for example, control module 290 of mobile device 110) may calculate a check digit using a suitable algorithm.

At block 740 (Determine an IMEI of the Mobile Device Based on at least one of the Read TAC, the Read Serial Number of the RF Module or the Calculated Check Digit), the mobile device (such as, for example, control module 290 of mobile device 110) may determine an IMEI of the mobile device (such as, for example, mobile device 110) based on at least one of the read TAC, the read serial number of the RF module (such as, for example, RF module 210 of mobile device 110) or the calculated check digit. By way of example, but not limitation, determined IMEI may be stored in memory 280.

Figure 8:
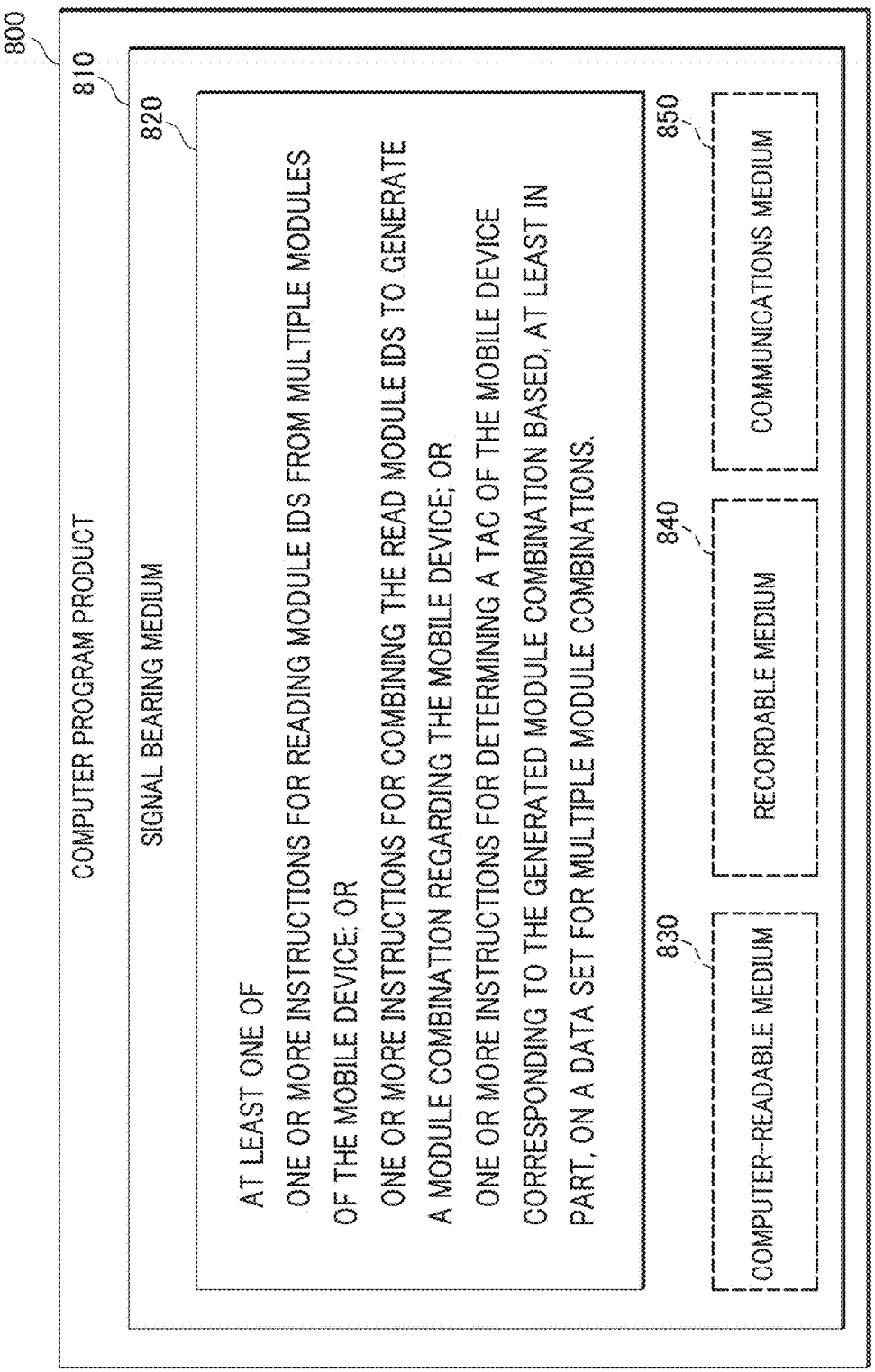
FIG. 8 illustrates an example computer program products that may be utilized to provide a model name determination scheme, arranged in accordance with at least some embodiments described herein.

FIG. 8 illustrates example computer program products that may be utilized to provide a model name determination scheme, arranged in accordance with at least some embodiments described herein. Computer program product 800 may include a signal bearing medium 810. Signal bearing medium 810 may include one or more instructions 820 that, when executed by, for example, a mobile device and/or a server, may provide the functionality described above with respect to FIGS. 1-7. By way of example, but not limitation, instructions 820 may include: one or more instructions for reading module IDs from multiple modules of the mobile device; one or more instructions for combining the read module IDs to generate a module combination regarding the mobile device; or one or more instructions for determining a TAC of the mobile device corresponding to the generated module combination based, at least in part, on a data set for multiple module combinations. Thus, for example, referring to FIG. 5, FIG. 6 and/or FIG. 7, mobile device 110 may undertake one or more of the blocks shown in FIG. 5, FIG. 6 and/or FIG. 7 in response to instructions 820.

In some implementations, signal bearing medium 810 may encompass a computer-readable medium 830, such as, but not limited to, a hard disk drive (HDD), a compact disk (CD), a digital versatile disk (DVD), a digital tape, memory, etc. In some implementations, signal bearing medium 810 may encompass a recordable medium 840, such as, but not limited to, memory, read/write (R/W) CDs, R/W DVDs, etc. In some implementations, signal bearing medium 810 may encompass a communications medium 850, such as, but not limited to, a digital and/or an analog communication medium (e.g., a fiber optic cable, a waveguide, a wired communication link, a wireless communication link, etc). Thus, for example, computer program product 800 may be conveyed to one or more modules of mobile device 110 and/or server 130 by an RF signal bearing medium 810, where the signal bearing medium 810 is conveyed by a wireless communications medium 850 (e.g., a wireless communications medium conforming with the IEEE 802.11 standard).

Figure 9:
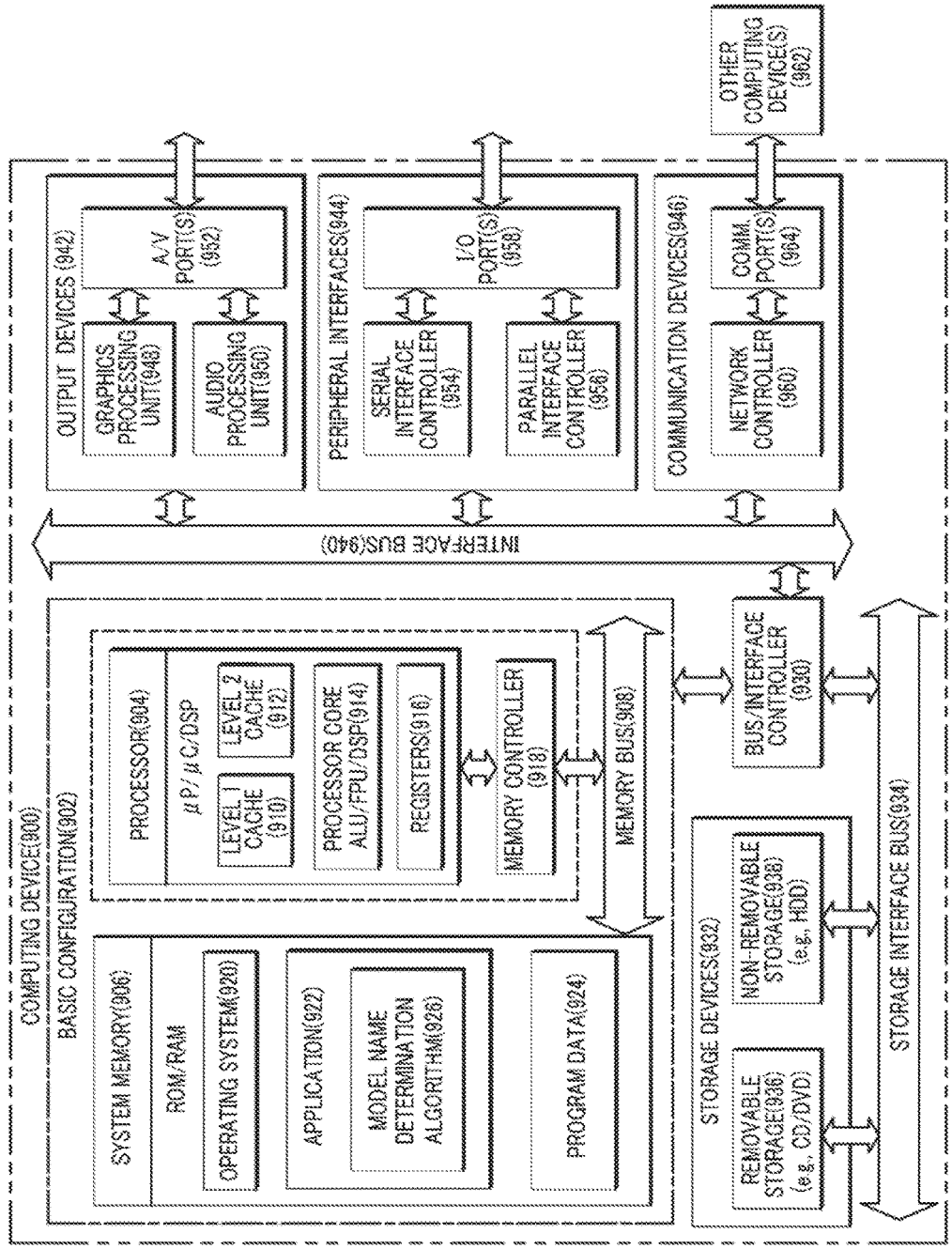
FIG. 9 is a block diagram illustrating an example computing device that may be utilized to provide a model name determination scheme, arranged in accordance with at least some embodiments described herein.

FIG. 9 is a block diagram illustrating an example computing device that may be utilized to provide a model name determination scheme, arranged in accordance with at least some embodiments described herein. In these examples, elements of computing device 900 may be arranged or configured for a mobile device. In a very basic configuration 902, computing device 900 typically includes one or more processors 904 and a system memory 906. A memory bus 908 may be used for communicating between processor 904 and system memory 906.

Depending on the desired configuration, processor 904 may be of any type including but not limited to a microprocessor (μP), a microcontroller (μC), a digital signal processor (DSP), or any combination thereof. Processor 904 may include one or more levels of caching, such as a level one cache 910 and a level two cache 912, a processor core 914, and registers 916. An example processor core 914 may include an arithmetic logic unit (ALU), a floating point unit (FPU), a digital signal processing core (DSP Core), or any combination thereof. An example memory controller 918 may also be used with processor 904, or in some implementations, memory controller 918 may be an internal part of processor 904.

Depending on the desired configuration, system memory 906 may be of any type including but not limited to volatile memory (such as RAM), non-volatile memory (such as ROM, flash memory, etc.) or any combination thereof. System memory 906 may include an operating system 920, an application 922, and program data 924.

Application 922 may include a model name determination algorithm 926 that may be arranged to perform the functions as described herein including the actions described with respect to a mobile device architecture as shown in FIG. 2 including the actions described with respect to the flow chart shown in FIGS. 5-7. Program data 924 may include any data that may be useful for providing the model name determination scheme as is described herein. In some embodiments, application 922 may be arranged to operate with program data 924 on an operating system 920 such that the scheme for determining a model name of a mobile device as described herein may be provided.

Computing device 900 may have additional features or functionality, and additional interfaces to facilitate communications between basic configuration 902 and any required devices and interfaces. For example, a bus/interface controller 930 may be used to facilitate communications between basic configuration 902 and one or more data storage devices 932 via a storage interface bus 934. Data storage devices 932 may be removable storage devices 936, non-removable storage devices 938, or a combination thereof. Examples of removable storage and non-removable storage devices include magnetic disk devices such as flexible disk drives and hard-disk drives (HDDs), optical disk drives such as compact disk (CDs) drives or digital versatile disk (DVDs) drives, solid state drives (SSDs), Secure Digital (SD) card and tape drives to name a few. Example computer storage media may include volatile and non-volatile, removable and non-removable media implemented in any method or technology for storage of information, such as computer readable instructions, data structures, program modules, or other data.

System memory 906, removable storage devices 936 and non-removable storage devices 938 are examples of computer storage media. Computer storage media includes, but is not limited to, RAM, ROM, EEPROM, flash memory or other memory technology, CD-ROM, digital versatile disks (DVD) or other optical storage, Secure Digital (SD) card, magnetic cassettes, magnetic tape, magnetic disk storage or other magnetic storage devices, or any other medium which may be used to store the desired information and which may be accessed by computing device 900. Any such computer storage media may be part of computing device 900.

Computing device 900 may also include an interface bus 940 for facilitating communication from various interface devices (e.g., output devices 942, peripheral interfaces 944, and communication devices 946) to basic configuration 902 via bus/interface controller 930. Example output devices 942 include a graphics processing unit 948 and an audio processing unit 950, which may be configured to communicate to various external devices such as a display or speakers via one or more A/V ports 952. Example peripheral interfaces 944 include a serial interface controller 954 or a parallel interface controller 956, which may be configured to communicate with external devices such as input devices (e.g., keyboard, mouse, pen, voice input device, touch input device, etc.) or other peripheral devices (e.g., printer, scanner, etc.) via one or more I/O ports 958. An example communication device 946 includes a network controller 960, which may be arranged to facilitate communications with one or more other computing devices 962 over a network communication link via one or more communication ports 964.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, but not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of a mobile device, the method comprising:
   reading module identifiers (IDs) from a plurality of modules of the mobile device;
   combining the read module IDs to generate a module combination of the mobile device;
   determining a Type Approval Code (TAC) of the mobile device, which corresponds to the generated module combination based, at least in part, on a first data set for a first plurality of module combinations;
   transmitting a request for a latest data set to a server;
   receiving the latest data set from the server;
   updating the first data set with the latest data set;
   determining whether the generated module combination corresponds to one of a second plurality of module combinations of the updated first data set; and
   in response to the determination that the generated module combination does not correspond to the one of the second plurality of module combinations of the updated first data set, generating a first alert signal.

2. The method of claim 1, further comprising:
   determining a model name of the mobile device, which corresponds to the generated module combination based, at least in part, on the first data set.

3. The method of claim 2, further comprising:
   storing, in a memory of the mobile device, the determined TAC and the determined model name; and displaying, on a display of the mobile device, at least one of the determined TAC or the determined model name.

4. The method of claim 2, wherein the first data set is stored in a memory of the mobile device, wherein the first data set comprises a plurality of TACs and corresponding model names, wherein each pair of TAC and corresponding model name corresponds to one of the first plurality of module combinations.

5. The method of claim 4, wherein the determining the TAC comprises determining whether the generated module combination corresponds to one of the first plurality of module combinations of the first data set.

6. The method of claim 5, further comprising:
in response to the determination that the generated module combination does not correspond to the one of the first plurality of module combinations of the first data set, generating a second alert signal.

7. The method of claim 1, wherein the plurality of modules include a radio-frequency (RF) module, and wherein the method further comprises:
reading a serial number of the RF module;
calculating a check digit;
determining an International Mobile station Equipment Identity (IMEI) of the mobile device based on at least one of the determined TAC, the serial number of the RF module or the check digit; and
storing the determined IMEI in a memory of the mobile device.

8. The method of claim 1, further comprising:
transmitting, to the server, the request for the latest data set on a periodic basis.

9. The method of claim 1, further comprising:
reading a serial number of at least one of the plurality of modules of the mobile device; and
transmitting the read serial number to the server.

10. A mobile device, comprising:
a plurality of modules that includes a control module; and
a memory configured to store a first data set for a first plurality of module combinations,
wherein the control module is configured to:
read module identifiers (IDs) from two or more modules among the plurality of modules;
combine the read module IDs to generate a module combination of the mobile device;
determine whether the generated module combination corresponds to one of the first plurality of module combinations of the first data set;
transmit a request for a latest data set to a server;
receive the latest data set from the server;
update the first data set with the latest data set;
determine whether the generated module combination corresponds to one of a second plurality of module combinations of the updated first data set; and
in response to the determination that the generated module combination does not correspond to the one of the second plurality of module combinations of the updated first data set, generate a first alert signal.

11. The mobile device of claim 10, wherein the first data set comprises a plurality of Type Approval Codes (TACs) and corresponding model names, and wherein each pair of TAC and corresponding model name corresponds to one of the first plurality of module combinations.

12. The mobile device of claim 11, wherein the control module is further configured to:
in response to the determination that the generated module combination corresponds to one of the first plurality of module combinations of the first data set, identify a pair of TAC and corresponding model name for the mobile device; and
store, in the memory, the identified pair of TAC and the corresponding model name for the mobile device.

13. The mobile device of claim 12, wherein the plurality of modules further include a radio-frequency (RF) module, and wherein the control module is further configured to:
read a serial number of the RF module;
calculate a check digit; and
determine an International Mobile station Equipment Identity (IMEI) of the mobile device based on at least one of the identified pair of TAC, the serial number of the RF module or the check digit.

14. The mobile device of claim 11, wherein the control module is further configured to, in response to the determination that the generated module combination does not correspond to the one of the first plurality of module combinations of the first data set, generate a second alert signal.

15. The mobile device of claim 10, wherein the plurality of modules further include a radio-frequency (RF) module, a camera module, a Near Field Communication (NFC) module, a power supply module, a battery pack, or a chassis.

16. A non-transitory computer-readable storage medium having stored thereon computer-executable instructions that, in response to execution, cause a mobile device to perform operations, comprising:
reading module identifiers (IDs) from a plurality of modules of the mobile device;
combining the read module IDs to generate a module combination of the mobile device;
determining a Type Approval Code (TAC) of the mobile device, which corresponds to the generated module combination based, at least in part, on a first data set for a first plurality of module combinations;
determining a model name of the mobile device, which corresponds to the generated module combination based, at least in part, on the first data set for the first plurality of module combinations;
storing, in a memory of the mobile device, the determined TAC and the determined model name;
transmitting a request for a latest data set to a server;
receiving the latest data set from the server;
updating the first data set with the latest data set;
determining whether the generated module combination corresponds to one of a second plurality of module combinations of the updated first data set; and
in response to the determination that the generated module combination does not correspond to the one of the second plurality of module combinations of the updated first data set, generating an alert signal.

\* \* \* \* \*